(12) United States Patent
Tomasi et al.

(10) Patent No.: US 6,811,178 B2
(45) Date of Patent: Nov. 2, 2004

(54) UMBRELLA-TYPE FOLDING FRAME PARTICULARLY FOR PUSH-CHAIRS

(75) Inventors: Ivan Tomasi, Sovizzo (IT); Nicola Marchiori, Camisano Vicentino (IT); Roberto Gorza, Feltre (IT)

(73) Assignee: L'Inglesina Baby S.p.A., Altavilla (IT)

( * ) Notice: Subject to any disclaimer, the term of this patent is extended or adjusted under 35 U.S.C. 154(b) by 0 days.

(21) Appl. No.: 10/077,973

(22) Filed: Feb. 20, 2002

(65) Prior Publication Data

US 2002/0113414 A1 Aug. 22, 2002

(30) Foreign Application Priority Data

Feb. 20, 2001 (IT) ..................................... VR2001A0022

(51) Int. Cl.[7] .................................................. B62B 1/00
(52) U.S. Cl. ..................................... 280/650; 280/642
(58) Field of Search ................................ 280/642, 647, 280/643, 648, 649, 650, 657, 658, 47.38, 47.4, 644; D12/129; 297/16.2, 250.1

(56) References Cited

U.S. PATENT DOCUMENTS

| 4,042,249 A | | 8/1977 | Kassai | |
| 4,118,052 A | * | 10/1978 | Cabagnero | 280/642 |
| 4,152,010 A | | 5/1979 | Kassai | |
| 4,232,897 A | * | 11/1980 | Maclaren et al. | 280/647 |
| 4,986,564 A | * | 1/1991 | Liu | 280/642 |
| 5,221,106 A | * | 6/1993 | Shamie | 280/644 |
| 5,622,376 A | * | 4/1997 | Shamie | 280/642 |
| 6,322,097 B1 | * | 11/2001 | Lan | 280/642 |
| 6,572,133 B1 | * | 6/2003 | Stevens | 280/642 |

FOREIGN PATENT DOCUMENTS

| EP | 0 655 379 A2 | | 5/1995 |
| FR | 2579545 | * | 10/1986 |
| GB | 2145982 | * | 4/1985 |
| JP | 2234876 | * | 9/1990 |
| JP | 40252770 | * | 9/1992 |

* cited by examiner

Primary Examiner—Bryan Fischmann
(74) Attorney, Agent, or Firm—Birch, Stewart, Kolasch & Birch, LLP

(57) ABSTRACT

An umbrella-type folding frame particularly for push-chairs having a pair of front upper and lower struts, a pair of rear struts, at least one lock-release mechanism between each upper strut and its respective lower strut, an articulated connection structure between said rear struts and a lifting handle, connected to the articulated structure, which is designed, upon being actuated, to cause the frame to set from an open or extended position to a closed or collapsed position and a driving device located on said frame at the said lifting handle for the remote control of said lock-release mechanism.

26 Claims, 6 Drawing Sheets

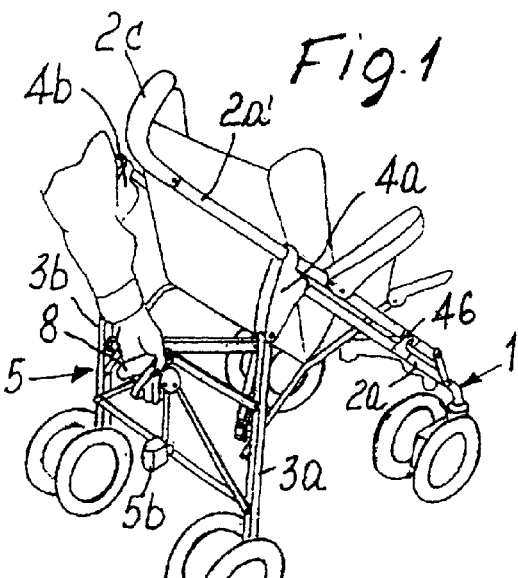
Fig. 1
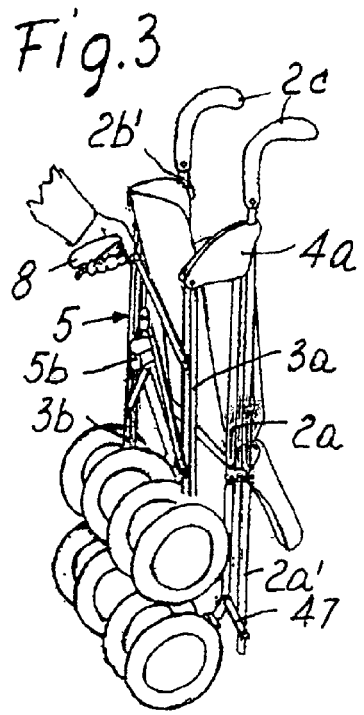
Fig. 3
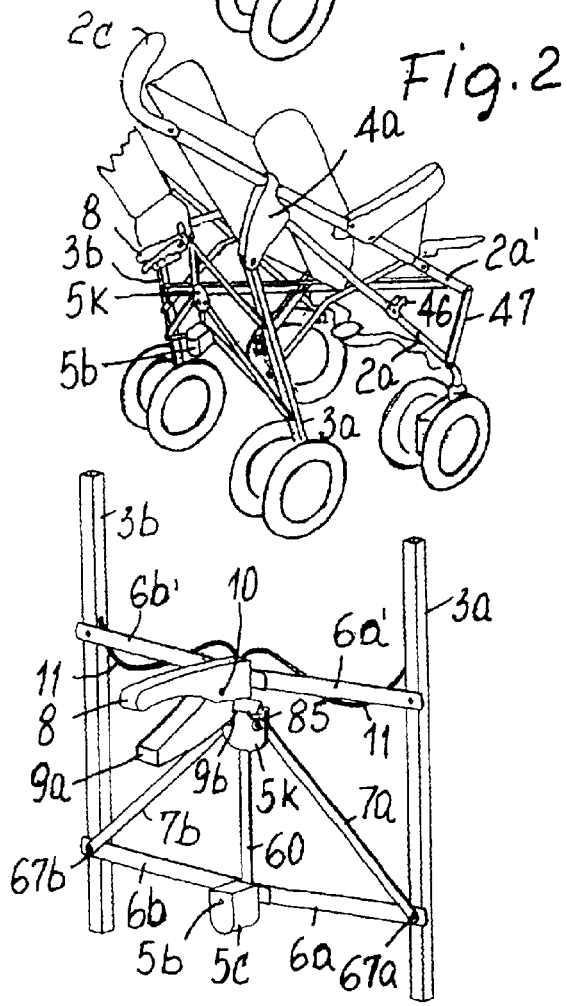
Fig. 2
Fig. 4
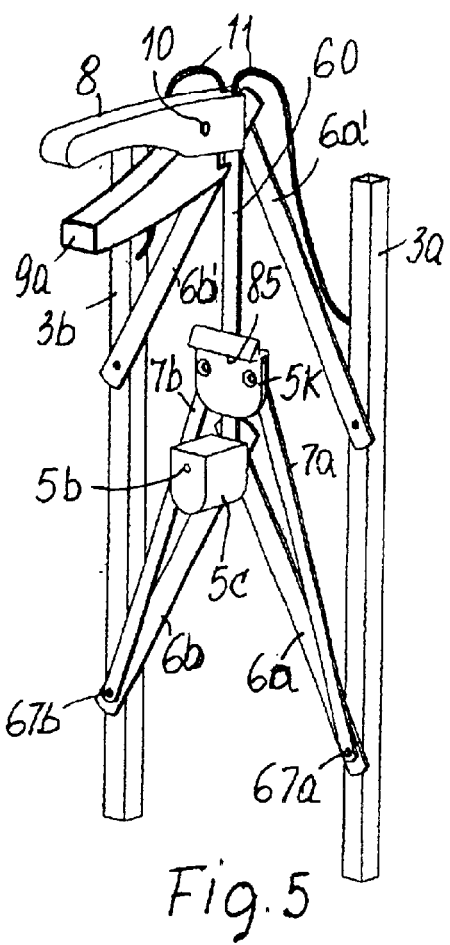
Fig. 5

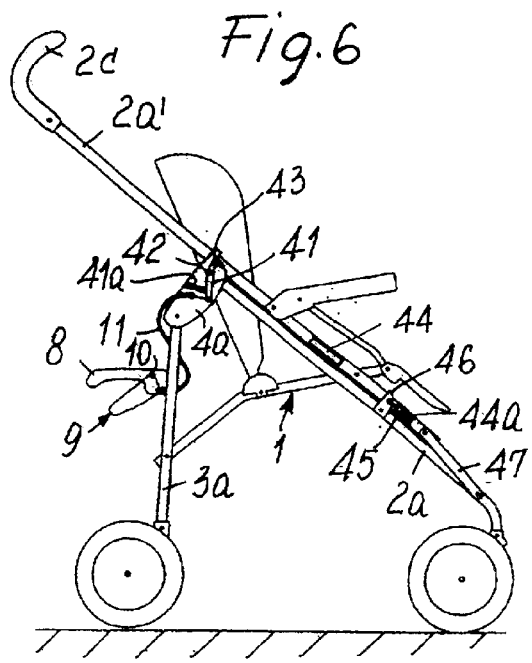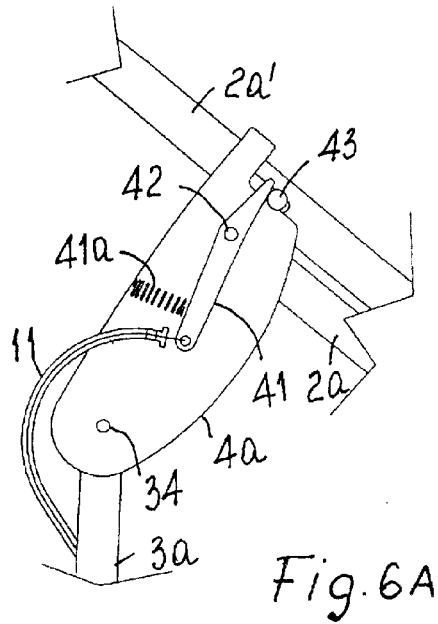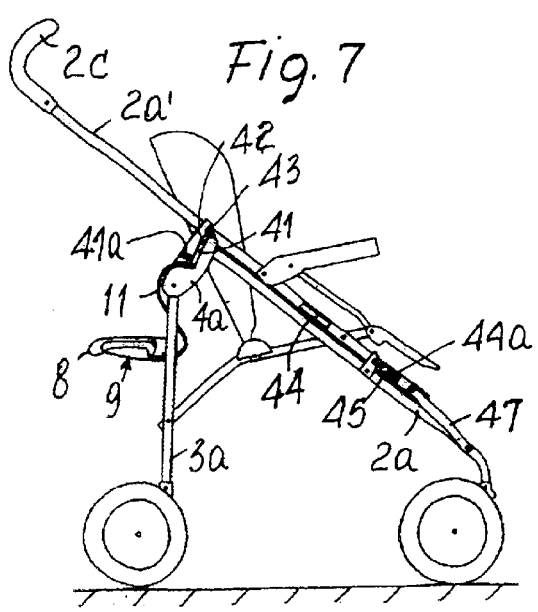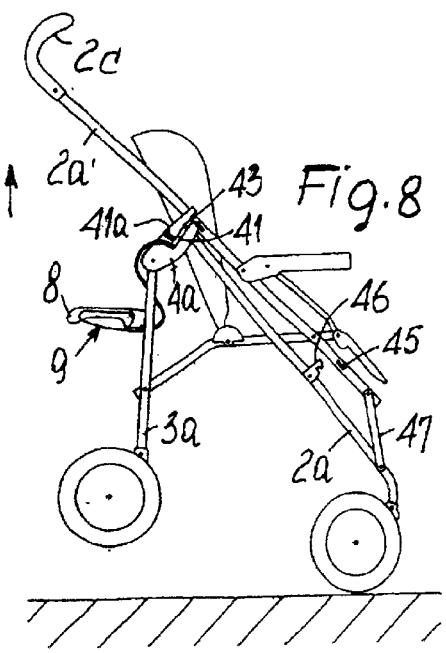

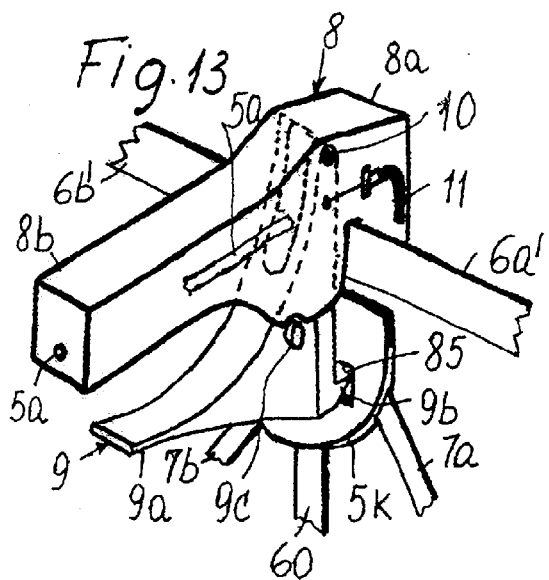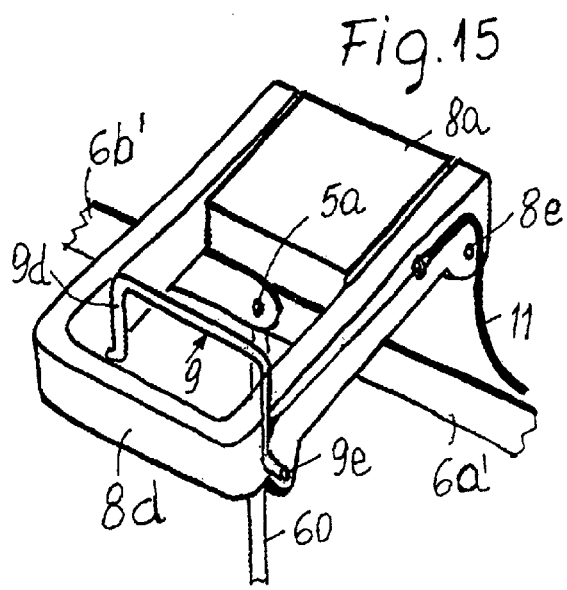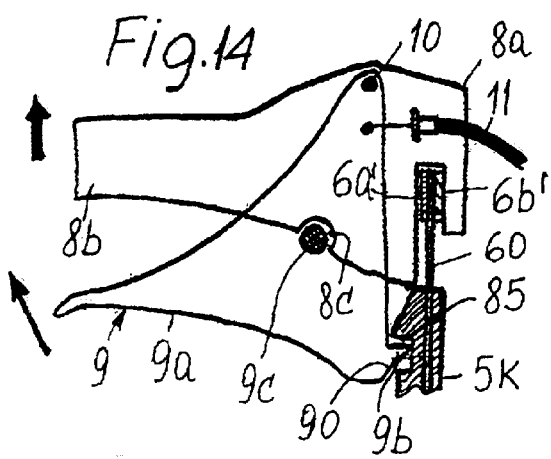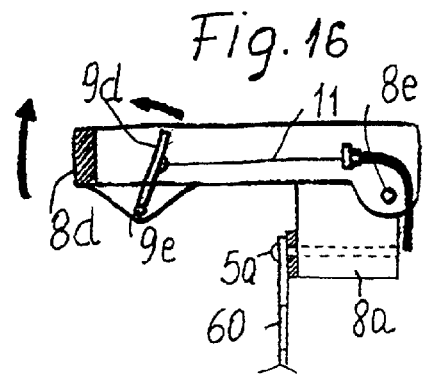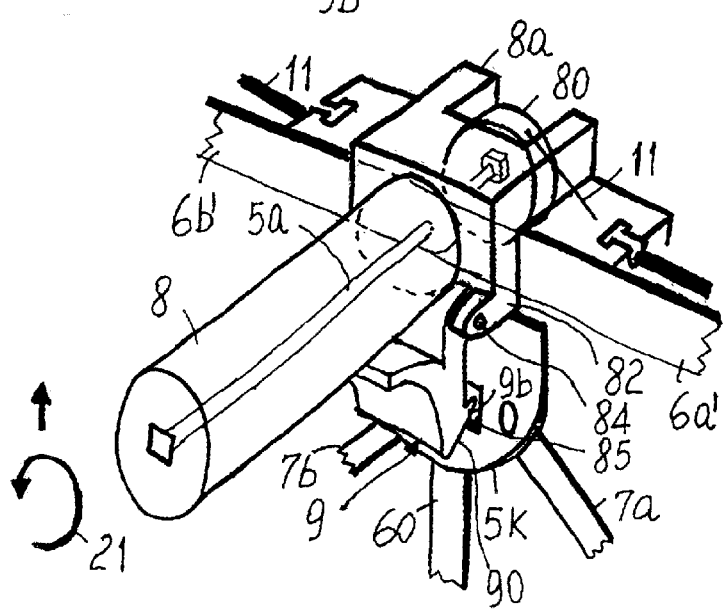

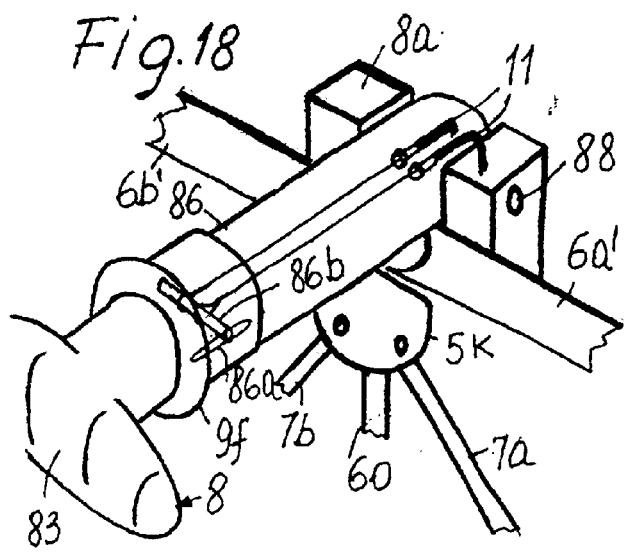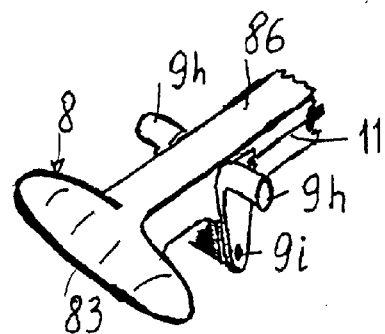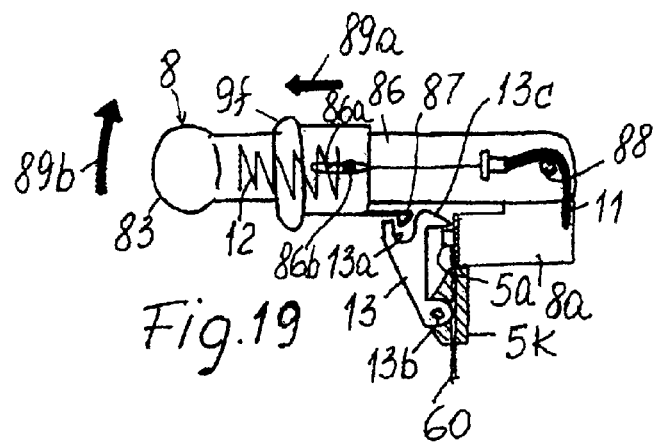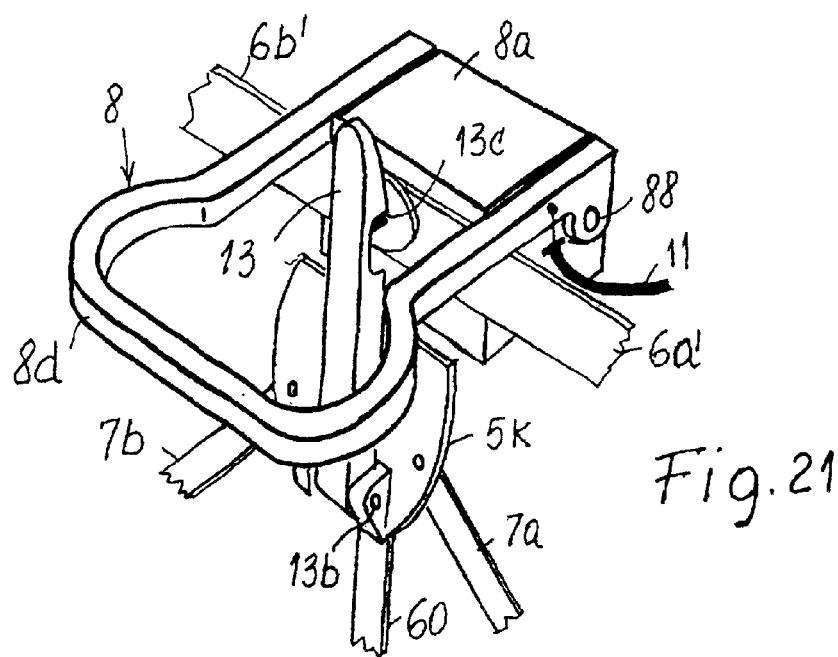

UMBRELLA-TYPE FOLDING FRAME PARTICULARLY FOR PUSH-CHAIRS

BACKGROUND OF THE INVENTION

The present invention relates to an umbrella-type folding frame particularly, but not exclusively, suitable for push-chairs and the like.

As is known, push-chairs with umbrella-type folding frames, i.e. that fold both transversely and longitudinally, are quite common. Besides, push-chairs, prams and infant seats for cars can be hooked onto these frames.

Generally speaking, folding of these umbrella-type frames takes place in two distinct stages, firstly the user has to release a lock/release articulation mechanism between an upper strut (also called the handle tube) and a lower strut (also referred to hereinafter as the front leg tube), and only after this can the active folding process be carried out.

The releasing of the lock/release mechanism is normally effected by acting on the devices located at the push-chair handle or at the mechanism itself, while the active folding stage is carried out by means of suitable lifting handles, or by pressing or pushing the handle tube downwards to go from an open to a closed position.

This generally means that the user has to employ both hands to close the frame and, in any case, has to carry out two distinct operation steps which make the closing process laborious and also increases the time taken by such an operation.

BRIEF SUMMARY OF THE INVENTION

The main object of the present invention is to avoid the inconvenience referred to above by providing an umbrella-type folding frame particularly, but not exclusively, suitable for push-chairs and the like.

In this context, an object of the invention is to provide an umbrella-type folding frame that can be folded or unfolded with a single operation.

Another object of the present invention is to provide an umbrella folding frame that its easy and practical to use.

A further object of the present invention is to provide a structurally-simple foldable frame that can be produced at low cost.

These and other objects that will be described below, are achieved by an umbrella-type folding frame particularly for push-chairs and the like, comprising a pair of front upper and lower struts, a pair of rear struts, a pair of support or engagement rigid members each having one end thereof pivoted to a respective rear strut; and its other end slidably engaged with a respective upper strut and secured to a respective lower strut, and at least one lock-release mechanism between each upper strut and its respective lower strut. Also included are a lifting handle, an articulated connection structure between said rear struts, a lifting handle and one driving device located on said articulated structure at the said lifting handle and arranged to control said lock-release mechanism, whereby the sequential effect of said driving device being actuated and said lifting handle being lifted causes the folding frame to set from an open or extended position to a closed or collapsed position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further features and advantages of the present invention will become better apparent from the following detailed description of some currently preferred embodiments thereof given by way non-limiting examples only, with reference to the accompanying drawings, in which:

FIG. 1 shows a perspective view of a folding frame according to the invention in its open condition;

FIG. 2 shows a perspective view of a folding frame while being closed;

FIG. 3 shows a perspective view of a folding frame according to the present invention while being closed or collapsed for transportation;

FIG. 4 is a diagrammatic perspective view of a double four-bar linkage in its extended position arranged to connect rear struts of the folding frame of FIG. 1;

FIG. 5 is a diagrammatic perspective view on a slightly enlarged scale of the double four-bar linkage of FIG. 4 in its partly folded or collapsed position;

FIG. 6 shows a side elevation view of a push-chair attached to a folding frame according to the invention when opened;

FIG. 6A shows a detail on an enlarged scale of FIG. 6;

FIG. 7 shows a view similar to that of FIG. 6 while the lock/release mechanism is being actuated;

FIG. 8 shows a similar view of that of FIG. 7 while the lock-release mechanism is also being lifted upwards after having been actuated;

FIG. 13 shows a perspective view of a pistol grip handle;

FIG. 14 is a side elevation view of the pistol grip handle illustrated in FIG. 13;

FIG. 15 shows a perspective view of another embodiment of handle grip;

FIG. 16 shows a side elevation view partly in cross-section of the handle grip of FIG. 15;

FIG. 17 shows a perspective view of a handle mounted for rotation on the frame according to a further embodiment of the present invention;

FIG. 18 shows a perspective view of a further embodiment of control handle;

FIG. 19 shows a side elevation view partly in cross-section of the handle of FIG. 18;

FIG. 20 is a diagrammatic perspective view of a modification of the handle of FIGS. 18 and 19;

FIG. 21 shows a perspective view of a lever handle and locking mechanism assembly;

In the Figures the same reference numerals have been used to indicate the same or similar components or parts.

DETAILED DESCRIPTION OF THE PREFERRED EMBODIMENTS

Figure 9:
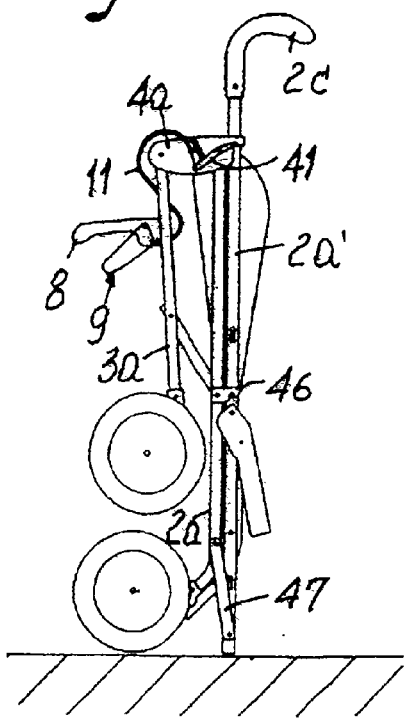
FIG. 9 shows a view similar to that of FIG. 8 with the frame fully closed or folded.

With reference first to the embodiment shown in FIGS. 1 to 14, an umbrella type folding frame particularly, but not exclusively, suitable for push-chairs and the like according to the present invention, is generally indicated by the reference numeral 1 and comprises a pair of upper and lower front struts, in particular a pair of upper struts (handle tubes) 2a' and 2b' linked to a pair of lower struts (front legs tubes) 2a and 2b, a pair of rear struts 3a and 3b and support rigid members or motion transmission means 4a and 4b for the articulation of each front strut with its respective rear strut, as further explained hereinbelow.

As shown in FIGS. 4 and 5, the rear struts 3a and 3b are connected to each other by an articulated connection structure comprising a double four-bar linkage 5 (known per se in the art) comprising upper bars 6a', 6b' and lower bars 6a 6b, diagonal braces 7a and 7b and a rod 60 which is arranged vertical in use.

The articulated structure also has a lifting handle 8 for maneuvering the four bar linkage 5 and lifting the entire folding frame so as to cause the folding frame, while in its open or extended position (FIG. 1), to take, if desired, a closed or collapsed position (FIGS. 3 and 9). The lifting handle 8 is secured to an articulation upper pin or node 5a (FIG. 13) to which one end of the upper bars 6a, 6b and the (upper) end of the rod 60 are linked.

The four-bar linkage 5 also has a lower pin or node 5b to which one end of the lower bars 6a, 6b and the (lower) end of the rod 60 are linked. Usually, pin 5b also supports a pedal block 5c on which a user's foot can rest while user's hand exerts a lifting force on the handles 2c, in order to make the opening operation easier and quicker and to make sure that double four-bar linkage 5 is fully extended.

Along the rod 60, which is linked to upper pin 5a and lower pin 5b, a cursor 5k is slidably mounted to which one end of each of the diagonal braces 7a, 7b is linked, the other end of the diagonal braces 7a, 7b being pivoted at 67a, 67b to a respective rear strut 3a, 3b together with the other end of the lower bars 6a, 6b.

The double four-bar linkage 5 described above, when in its extended position, keeps the rear struts 3a and 3b spaced apart from each other and the cursor 5k is located in its uppermost position on the rod 60 (FIG. 4), thereby allowing use, e.g. of a push-chair, whereas when in its collapsed position the cursor 5k is caused to slide downwards along the rod 60 and the same struts are moved together so that the frame is folded up for easy transportation (FIG. 5).

The rear lifting handle 8 is arranged to co-operate with one centralized driving device 9 for the remote-control of the motion transmission means 4a and 4b and/or the lock-release mechanisms as described hereinbelow.

As is better shown in FIGS. 4, 5, 13 and 14, the driving device 9 is a manual device, i.e. it comprises a lever 9a pivoted through a pivoting fulcrum 10 to the handle 8 that has an support portion 8a linked to the articulated the upper bars 6a', 6b' at pin 5a and an oblong portion 8b which acts as a resting member for the user's hand while actuating the lever 9a, so as to make the maneuver easier. The driving lever 9a is designed to control through two steel cables 11, which advantageously are of the sheathed type, a control lever 41 (FIGS. 6 to 9) linked at a respective fulcrum 42 secured to the folding frame and spring loaded by a return spring 41a, preferably supported by the support cases 4a, 4b (FIG. 6A).

More particularly, by acting on the centralized driving device 9 the two steel cables 11 are actuated which operate a respective lever 41 of the transmission means 4a, 4b, whereby each lever 41 is caused to be angularly displaced in order to displace a respective upper pin 43, e. g. projecting from an upper strut 2a', 2b' and secured to a respective control rod 44. Each control rod 44 is slidably mounted inside a respective upper tubular strut 2a', 2b' and has a lower transverse pin 45, which can also project from its locating upper strut. The control rod 44 is preferably resiliently loaded, e.g. by a return spring 44a. The lower pins 45 are each designed to engage with a respective hook 46 secured to its adjacent lower strut 2a, 2b when the folding frame 1 is in its opened or extended position.

At its lower end each upper strut 2a', 2b' is linked to its respective lower strut 2a, 2b by means of a respective connecting rod 47.

More particularly, the motion transmission means 4a, 4b comprises a rigid support body or case that locate a respective lever 41, a return spring 41a and has one end thereof pivoted at 34 (FIG. 6A) to the upper end of a respective rear strut 3a, 3b and its other end slidably engaged with a respective upper strut 2a', 2b' and secured to a respective lower strut 2a, 2b. Thus, the resultant movement of the upper struts 2a', 2b' with respect to the lower struts 2a, 2b is a combination movement of a sliding displacement through its respective case or body 4a, 4b and a pivotal movement caused by the connecting rod 47.

Moreover, in the above described embodiment of the invention the driving device 9 also acts as a locking means arranged to removably secure the cursor 5k in its uppermost position on the rod 60 in order to block the four-bar linkage 5 in its opened or extended position, so that any unwanted movement of the four-bar linkage 5 is prevented. To this end, the lever 9a is formed with an end tooth 9b designed to engage with a recess 85 provided in the cursor 5k when the four-bar linkage 5 is in its extended position and the lever 9a is in its released position, as better apparent from FIGS. 4, 13 and 14, and to be disengaged therefrom when the lever 9a is actuated by the user or the four-bar linkage 5 is in a collapsed or closed condition (FIG. 5).

Advantageously, lever 9a has a lower inclined-plane surface 90 arranged to automatic engage tooth 9b with recess 85. The lever 9a can also be provided with a limit button 9c (FIGS. 13 and 14) arranged to abut against a respective notch 8c in the lifting handle 8 to prevent the engagement tooth 9b from accidentally becoming disengaged from recess 85.

Figure 11:
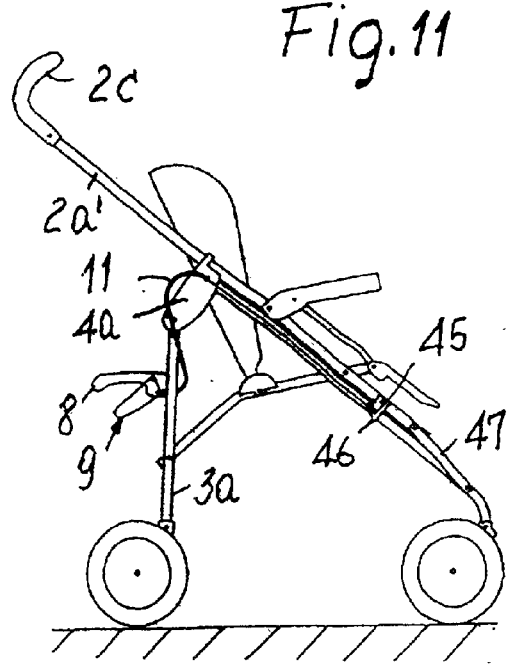
FIG. 11 is a side elevation view of a push-chair provided with a folding frame mechanism according to a further embodiment of the invention shown in its opened position.
Figure 12:
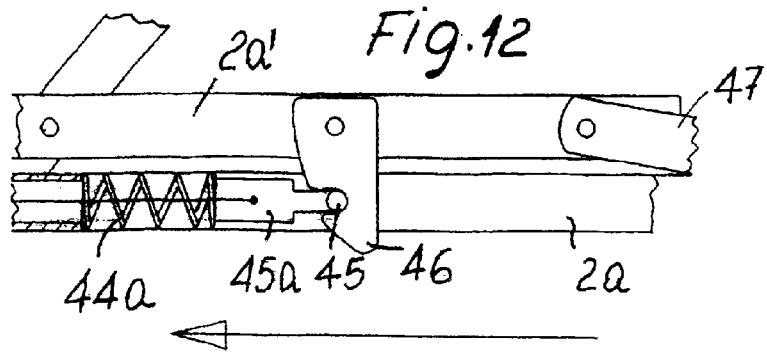
FIG. 12 illustrated a detail on an enlarged scale of FIG. 11.

In the embodiment shown in FIGS. 11 and 12, components 41, 41a, 43 and 44 of the transmission means are omitted and thus cables 11 are directly secured to a respective pin 45 and/or extend through the lower tubes 2a, 2b to reach a pin bearing member 45a which is resiliently loaded by spring 44a. In this case, the hook 46 is secured to the upper struts 2a', 2b' and arranged upturned, whereby pin 45 is pulled by its respective cable 11.

FIGS. 15 and 16 illustrate another embodiment of lifting handle 8 and driving device 9, in which the lifting handle 8 comprises a grip portion 8d shaped as a frame pivoted at 8e to a support portion 8a secured to the upper node or pin member 5a supported by the articulated connection structure 5, whereas the driving device 9 includes a manual rocking member 9d that is pivoted to one end 9e of the grip portion 8d of the lifting handle. The rocking member 9d is arranged to actuate the cables 11 that are directly connected to it in order to actuate the transmission means 4a and 4b and/or the pin bearing member 45a.

FIG. 17 shows a further embodiment of lifting handle 8 and driving device 9, in which the handle 8 is rotatably mounted on a support portion 8a secured to the upper pin 5a. The pin 5a also supports a pulley 80 and a support portion 8a which is thus arranged between handle 8 and pulley 80. The pulley 80 is rigid in rotation with the pin 5a and the handle 8. At two diametrically opposite positions of the pulley 80 one end of a cable 11 is secured whose other end is connected either to the motion transmission means or directly to the pin bearing member 45a.

The support portion 8a has one or a pair of downwardly extending lugs 82, to which driving device 9 is formed as a trigger-like lever is hingedly hung at 84 which is formed with an engaging tooth 9b designed to engage with an opening 85 provided in the cursor 5k. If desired, the trigger-like lever 9 can be spring-loaded so as to be urged forward, i.e. into engagement with the opening 85, and is formed with a lower inclined-plane surface 90 for automatic engagement of driving device (lever) 9 with the recess 85.

With this arrangement, an angular displacement or partial rotation (e.g. such as indicated by arrow 21) of the handle 8 results in the cables 11 being actuated, thereby controlling either the motion transmission means 4a, 4b or directly the pinbearing member 45a so as to unlock pin 45 from hook 46 before lifting the folding frame 1 (push-chair) for causing it to collapse before lowering it against a support, e.g. the ground, for causing the same to be erected.

A further embodiment of lifting handle 8 and driving device 9 is shown in FIGS. 18 and 19, wherein the handle 8 has an end T-shaped handling portion 83 and a shank portion 86 on which a manual annular flanged member 9f secured to one end of cables 11 is slidably mounted, so that it can be moved to and fro on the shank portion 86 in contrast with a resilient means, e.g. a return spring 12. The manual annular flanged member 9f also has an engaging tooth 87 projecting downwards that, when the frame 1 is in its open position, is arranged so as to engage with, and to be retained in, a recess 13a formed in a lever member 13. Lever member 13, in turn, has its lower end pivoted at 13b to the cursor 5k and its upper end 13c shaped as a hook designed to engage a respective notch in a support portion 8a of the lifting handle 8.

If desired, the lever member 13 can be spring loaded so as to keep it urged towards the cursor 5k and the upper end 13c has its upper front shaped as an inclined plane surface so that the hook automatically engages with the notch while the folding frame 1 is being erected to its opened position.

Moreover, the shank portion 86 is tubular in structure and has a pair of side slots 86a, in which a transverse pin 86b is slidably mounted and has projecting ends secured to the flanged member 9f.

More particularly, the support portion 8a is shaped as an upwardly directed fork, to which the remote end of the shank portion 86 is pivoted at 88, and is secured at the bottom thereof to upper pin 5a of the four-bar linkage 5.

A modification is shown in FIG. 20, wherein the annular sliding component 9f is replaced by a pair of crank-like levers 9h to which an end of a respective cable 11 is secured. Each lever 9h has one end pivoted at 9i to the shank 86 of handle 8 and its other end extending at right angles thereto and shaped a small handle.

To cause folding frame 1 to collapse, the user first pulls (against the action of springs 12 and 44a) the annular member 9f or the crank levers 9h towards the Tshaped portion 83 (arrow 89a) so as to disengage pins 45 from their respective hooks 46 and the hook 13c from its respective engaging notch. He then lifts the Tshaped portion 83 upwards (arrow 89b), thereby causing the shank portion 86 to pivot about the transverse pin 88, thus unlocking the lever member 13. By further lifting the folding frame 1, the user caused it to collapse owing to the weight of the lifting frame.

Another embodiment of lifting handle and driving device 9 is shown in FIGS. 21 to 24, where the lifting handle 8 comprises a grip portion 8d is the form of a handle frame, which is articulated at 88 to a support portion 8a that is connected to the upper node or pin 5a. Grip frame portion 8d is connected to one end of the cables 11. There is also provided a lever member 13 having its lower end pivoted to the cursor 5k at 13b and having an upper end 13c formed as an engaging tooth arranged to engage with an extension of upper pin 5a. If desired, the lever member 13 can be spring loaded so as to keep it urged towards the cursor 5k.

Figure 22:
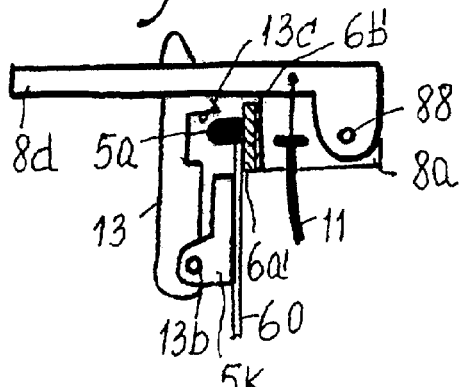
FIG. 22 shows a side elevation view partly in cross-section of the assembly illustrated in FIG. 21 while being in its locked position.
Figure 23:
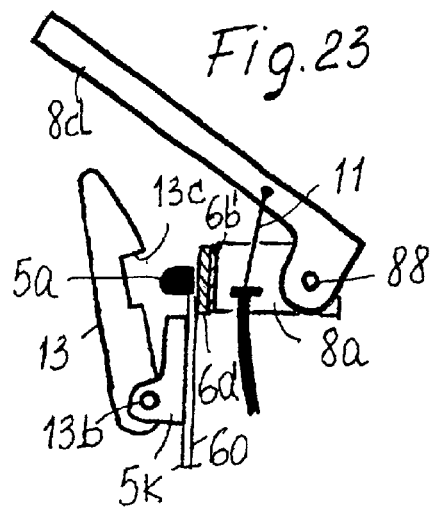
FIG. 23 shows a side elevation view of the assembly illustrated in FIG. 21 while being activated and released.
Figure 24:
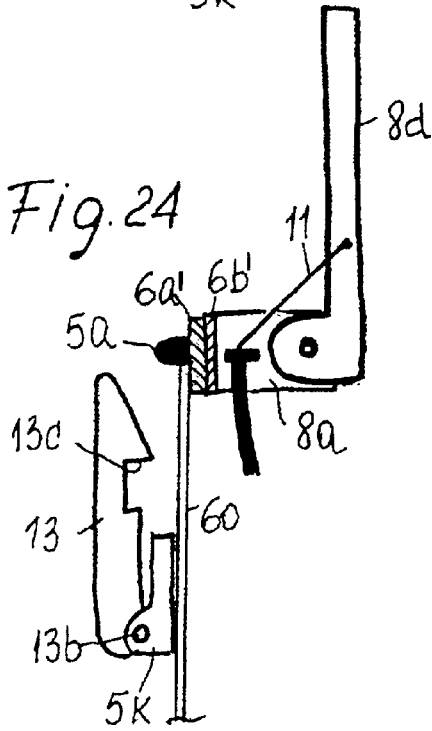
FIG. 24 shows a side elevation view of the assembly illustrated in FIG. 21 in its released condition and while the folding frame is being lifted.

When the folding frame 1 is in its opened condition the grip portion 8d is in a substantially horizontal position (FIG. 22). For causing the folding frame 1 to collapse, the user pulls backwards the lever member 13 with a finger so as to disengage its upper end (engaging tooth) 13c from the lug of pin 5a, then lifts the grip portion 8d thereby disengaging pins 45 from their hooks 46. By further lifting the folding frame 1, the folding frame 1 is easily caused to collapse.

In this case by simply lifting the handle 8, unlocking of pins 45 is caused, which results in substantial simplification of the maneuver. In order to ensure proper operation of this embodiment in any circumstance, care should be taken, when the folding frame is to be folded from its extended or opened condition, that the effort for partial rotation of the handle 8 for causing pins 45 to disengage from their respective hooks 46, is much lower than the total weight of the folding frame 1 otherwise, it might happen that owing to friction or another resisting cause the initial rotation of the handle 8 could result in the folding structure 1 being lifted from ground while the pins 45 are still in engagement with their respective hooks 46, which would prevent folding of the folding frame 1.

On the other hand, once the pins 45 have been disengaged from their hooks 46 collapse of the folding frame 1 occurs as a consequence of the entire structure being lifted upwards still by acting on handle 8.

Figure 25:
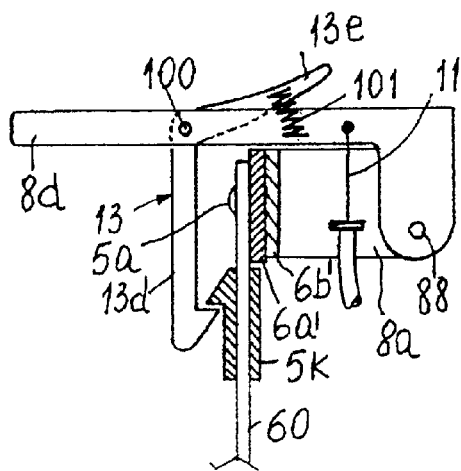
FIG. 25 is a side elevation view partly in cross-section of a modification of the lever handle and locking mechanism assembly of FIG. 21 in its locked position.
Figure 26:
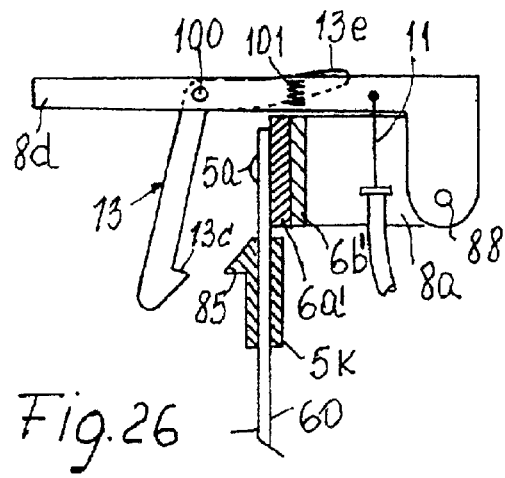
FIGS. 26 and 27 show the assembly of FIG. 25 while the locking mechanism is being released and the lever handle is being lifted, respectively.
Figure 27:
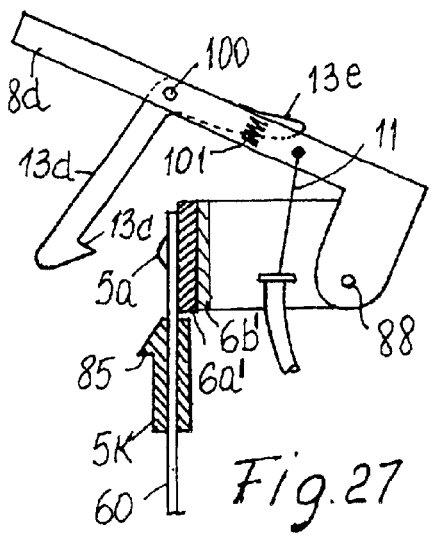

FIGS. 25 to 27 show a modification of the lever member 13 of FIGS. 21 to 24, in which unfolding of the folding frame 1 occurs in two stages. The lever member 13 is shaped as a bell crank and pivoted to the grip portion 8d at 100 so that one arm of the lever member extends, in use, substantially parallel to the rod 60 and terminates with an engaging tooth 13c designed to engage with a respective recess 85 provided in the cursor 5k, whereas the other arm 13e is inclined with respect to arm 13d and extending towards the support portion 8a. The bell crank 13 is spring biased, e.g. by a spiral pressure spring 101 having one end resting against the grip portion 8d and its other end abutting against the arm 13e thereby pushing it away from the handle, thus keeping tooth 13c in its engaged position with recess 85.

In order to fold the folding frame 1 starting from its fully extended position, the operator first acts on arm 13e by a finger of his hand handling grip portion 8d so as to cause upper end (engaging tooth) 13c to disengage from recess 85 against the action of the spring 101. The user then lifts the grip portion 8d, while keeping his finger on the arm 13e, whereby causing it to pivot about its pivot pin 88 while releasing the locking mechanism owing to the action of cables 11.

It will be noted that the umbrella-type folding frame according to the present invention operates in a very simple manner.

In order to cause collapse of the folding frame from its open (or extended) position to a closed (or collapsed) position, the user has simply to actuate the driving device 9 and lift handle 8 by hand. By so doing the pins 45 are caused to unlock against the thrust of the spring 44a, thus releasing the lower struts 2a, 2b from their respective upper struts 2a', 2b'.

Figure 10:
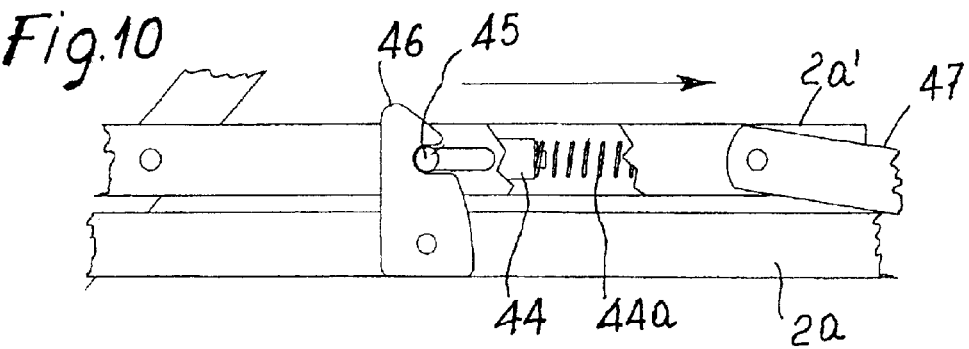
FIG. 10 shows a detail on an enlarged scale of FIGS. 6 to 9.

By further lifting the handle 8 the very weight of the entire structure is normally well suited to lead to collapse (or closure) of the folding frame owing to the of operative connection between the components parts, as is well known in the art, e.g. as disclosed in Italian Utility Models no. A-208 263 and no. A-213 692 (both in the name PEG PEREGO). At the end of the lifting operation, the folding frame is fully closed as shown in FIG. 10 and can be easily carried or stored by the user.

Disengaging of the lower pins 45 not only releases the upper struts 2a', 2b' but also causes pushing of the upper struts 2a', 2b' downwards owing to the action of springs 44a. This pushing force overcomes any resistance by the connecting rods 47 and causes a partial rotation upwards of the connecting rods 47 with no jibbing which is of great benefit for the efficiency of the collapsing movement of the folding frame 1.

When moving from closed to open position, closed folding frame 1 is "pulled upwards" at terminal handles 2c. The upper struts 2a', 2b' effect the same movements as in the closing stage but in the reverse direction, thereby moving apart the rear struts 3a and 3b with the result that the double four-bar linkage 5 is extended while the lower pins 45 fit into their locking hooks 46, thus blocking any relative movement between the struts.

Preferably, a pushing action exerted by user's foot on block 5c is added to ensure full extension of double four-bar linkage 5.

If desired, the driving device 9 can comprise a radio transmitting system, e.g. controlled by an automatic button, to transmit a control signal to the motion transmission means 4a, 4b or directly to pins 45.

The invention as described above is susceptible of numerous modifications and variations within the scope of the claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An umbrella-type folding frame for push-chairs, comprising:

a pair of front upper and lower struts, a pair of rear struts, a pair of engagement rigid members having one end thereof pivoted to rear struts and another end thereof slidably engaged with upper struts and secured to the lower struts, at least one lock-release mechanism disposed between each of the upper struts and the lower struts and connected to motion transmission means, a lifting handle, an articulated connection structure between said rear struts, and one driving device located on said articulated structure at said lifting handle and arranged to control said lock-release mechanism, whereby actuating said driving device and lifting said lifting handle causes the folding frame to change from an open or extended position to a closed or collapsed position.

2. The folding frame according to claim 1, wherein said driving device includes a manual actuation member arranged to move from a working to a rest position thereof.

3. The folding frame according to claim 1, wherein said driving device comprises a manual actuation member and a motion transmission means arranged between said manual actuation member and said lock-release mechanism.

4. The folding structure as claimed in claim 1, wherein said lifting handle comprises a support member or portion secured to said articulated connection structure.

5. The folding frame as claimed in claim 1, wherein said articulated connection structure comprises a cursor member designed to slide on a rod member while the folding frame is being folded or unfolded.

6. The folding frame according to claim 5, wherein said driving device comprises locking means arranged removably to secure said lifting handle to said cursor member or to said articulated connection structure.

7. The folding frame as claimed in claim 6, wherein said locking means comprises an engaging tooth designed to engage with a recess provided in said cursor member when said articulated connection structure is in its extended position.

8. The folding frame as claimed in claim 6, wherein said locking means comprises a manual actuation member having an inclined-plane surface arranged to automatically engage a tooth with a recess formed in said cursor member.

9. The folding frame as claimed in claim 6, wherein said driving device is a manual actuation member comprising a notch in said lifting handle and a limit member arranged to abut against said notch thereby preventing an engagement tooth from accidentally disengaging from a recess.

10. The folding frame as in claim 9 said actuation member comprises a loading spring.

11. The folding frame according to claim 1, wherein said lifting handle comprises an oblong element carried by said articulated connection structure and a manual actuation member comprises a lever member articulated to said oblong element and arranged to actuate said motion transmission means.

12. The folding frame according to claim 1, wherein said lifting handle comprises a grip portion secured to said articulated connection structure and a manual actuation member mounted for angular displacement or rotation relative to said grip portion and said motion transmission means between a manual actuation member and said at least one lock-release mechanism.

13. The folding frame according to claim 4, wherein said lifting handle comprises a rotating portion pivoted to said support member or portion and a pulley member rigidly attached to said handle and operatively connected to said motion transmission means.

14. The folding frame according to claim 1, wherein said handle is formed with a T-shaped hand grip, and a shank portion and includes an annular flanged member operatively connected to one end of said motion transmission means, and slidably mounted on said shank portion.

15. The folding frame as claimed in claim 14, wherein a locking means comprises a lever member having one end thereof pivotably attached to a cursor member and its other end shaped as a hook, and when the folding frame is in its open position, an engaging projecting tooth is in engagement with, and retained in a recess formed in said lever member.

16. The folding frame according to claim 14, comprising resiliency means for resiliently loading said flanged member.

17. The folding frame according to claim 1, wherein said handle comprises a frame lever element secured to said articulated connection structure and operatively connected to said motion transmission means.

18. The folding frame as claimed in claim 17, wherein a locking means comprises a lever member having one end thereof pivoted to a cursor member and its upper end formed with an engaging tooth arranged to engage with an extension of said articulated connection structure.

19. The folding frame as claimed in claim 18, wherein said lever member has said upper end at least partly shaped as an inclined plane surface thereby causing said engaging tooth automatically to engage with said extension.

20. A folding frame as claimed in claim 17, wherein a lever member is shaped as a bell crank and is pivoted to a frame handle, one arm of said lever member being formed with a tooth designed to engage with a respective recess provided in a cursor member, and another arm extending at an angle with respect to said one arm towards a support block.

21. The folding frame as claimed in claim 20, wherein the bell crank is biased by a spring.

22. The folding frame according to claim 1, wherein said motion transmission means comprises at least one cable, at least one control lever designed to be actuated by said driving device through the at least one cable, at least one engagement member arranged to be actuated by a lever member, at least one rod member slidingly carried by said upper struts and supporting an engagement member, thereby actuating said lock-release mechanism.

23. The folding frame according to claim 22, wherein said at least one cable is a sheathed cable.

24. The folding frame according to claim 22, wherein said motion transmission means comprises at least one strut component.

25. The folding frame according to claim 22, wherein said at least one rod member is slidably mounted inside at least one of said upper struts.

26. The folding frame according to claim 1, wherein said at least one lock-release mechanism is at least one resiliently loaded control member operatively connected to and controlled by said motion transmission means.

* * * * *